J. MORRIS.
Meat Cutter.
No. 459. Patented Nov. 20, 1837.
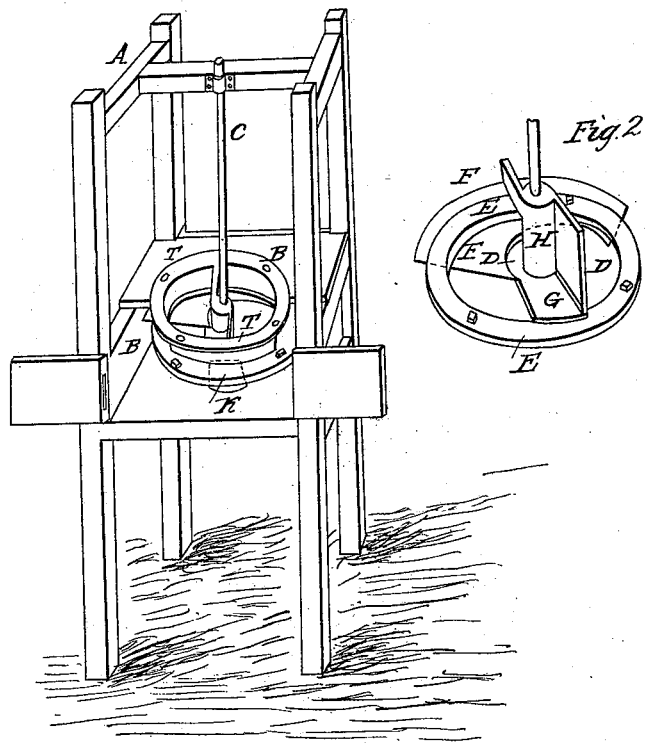

UNITED STATES PATENT OFFICE.

JOHN MORRIS, OF DERBY, CONNECTICUT.

MACHINE FOR CUTTING MEAT.

Specification of Letters Patent No. 459, dated November 20, 1837.

*To all whom it may concern:*

Be it known that I, JOHN MORRIS, of Derby, in the county of New Haven and State of Connecticut, have invented a new and useful improvement on a machine invented by me and secured to me by Letters Patent, dated February 25, 1835, called "a horizontal and transverse cutting machine for cutting meat or flesh to be used for food and other soft substances, and reducing them to parts or pieces of any required degree of fineness."

The object of my improvement is to make the machinery more simple, whereby it will be easier worked, and easier cleaned, and will perform its work as well and more expeditiously. This I effect by dispensing with all the knives described in the specification of the machine patented, and substituting in lieu of them, a single horizontal knife of a peculiar construction, and adding a part which I call a scraper, both of which will hereinafter be particularly described. The other parts of the machine being substantially the same as patented, with such alterations as will adapt them to the improvements suggested and also such as experience has shown to be useful, as will appear by the description of my improved machine, hereinafter given.

To enable others skilled in the art to make and use my invention, I will now describe the construction and operation of the machine made with my improvements. This I do as follows, viz:

My improved machine which I call "a horizontal cutter for meat and other substances," consists of a shaft,—a bed with a flange—a knife or scraper—and a hopper, all supported on a frame to be moved by a crank or other suitable gearing on the end of the shaft.

The frame may be made of wood, the other parts I make of suitable metal. The posts of the frame are about 4 inches square and 6 feet long, standing upright, 2 feet apart, connected by 10 girts of the same size viz. one in front, one in rear, 3 on each side and 2 crossing the frame in the center to support and steady the shaft as exhibited in the accompanying drawings, Figure 1, A, A. A receiving chamber or case is made within the frame, about 2 feet square, the bottom resting on the lower girt, about 2 feet down from the bottom of the posts and the top resting on the middle side girts, having double doors in front and rear as seen Fig. 1, B. B. This chamber may be lined with tin.

The shaft I make of round iron about 4 feet long and $2\frac{1}{2}$ inches in diameter, standing perpendicular pointed with steel at the lower end and resting in a step in the lower cross girt of the frame, and may be raised or lowered, by a screw, passing through the girt under the step. The top of the shaft is held in place, by passing through a metal box attached to the upper cross-girt of the frame, as seen Fig. 1, E. Near the lower end of the shaft a cross bar passes through it, projecting $1\frac{1}{4}$ inches on each side, to support the bed.

The bed is a round plate of metal 18 inches in diameter and one inch thick having a hole in the center $2\frac{1}{2}$ inches in diameter to receive the shaft, having a collar attached, projecting from the under side of the bed, around the shaft 4 inches in diameter and 5 inches deep, having an open mortise in the lower edge of the collar on each side to embrace the arms of the shaft when in place and thereby causing the bed to move around with the shaft. In this bed plate I make a scroll-shaped eccentric orifice, about an inch wide on the top and beveling wider at the bottom, commencing 2 inches and terminating 6 inches from the center of the machine, and sweeping over one half the area of the circular plate of the bed within the hopper as seen Fig. 2, D, D. On the outer edge of the bed plate is a flange or lip half an inch thick and 3 inches broad, secured to the bed plate by screws and thereby securing the knife in place, the flange being filed away on the under side, a length and depth sufficient to receive the knife with furring to raise it above the scraper. Fig. 2, E, E.

The knife should be made of the best of cast-steel in a thin plate about $\frac{1}{32}$ of an inch thick, the edge shaped to correspond with the open orifice in the bed and the back extending a little without the outer edge of the flange, as seen Fig 2, F, F.

The scraper is a flat plate of steel of the thickness of the knife about 4 inches wide and 8 long. One end of which embracing the shaft loosely, is attached by screws to the bottom of the collar or hub of the hopper. The other end extends to the flange on the bed. The scraper should be so placed and fixed as to bring the front edge directly under the front edge of the dividing plate of the hopper. The knife passes closely over the scraper cutting like shears as it passes, and the thickness of the cutting is gaged by it. See Fig. 2, G.

The hopper is a hollow cylinder of metal 12 inches in diameter on the inside and 5 inches deep. The sides are half an inch thick, with a lip or flange on the top of the same thickness 2 inches broad, to give strength and to secure it in place. The hopper is divided by a cross partition in the following manner. A hollow cylinder placed upright in the center, 4 inches in diameter and 5½ deep, having a hole in the center 2½ inches in diameter for the shaft to pass and play freely, is connected with the side of the hopper, by a plate L an inch thick and 5½ deep running in a tangent line from the outer surface of the central cylinder to the side of the hopper. The other side is connected by a bar an inch thick and 2 inches deep and forming a tangent on that side. This partition forms one piece as seen in Fig. 2, H, and is to be connected with the sides of the hopper even with the top rim by screws—or the whole hopper and partition may be cast together, as seen in place Fig. 1, T, I.

This improved machine is put together for use in the following manner. The shaft is put through the collar of the bed and the open mortices of the collar are fixed upon the arms of its cross bar. The hopper with its division plate and central collar, having the scraper attached to the bottom of the collar is thus placed, upon the shaft, and the parts thus connected are put in place within the chamber of the frame, the bottoms of the shaft resting in the step, and the top secured by the box on the top girt, while the hopper is suspended by its lip or flange made fast to the top covering of the chamber, its sides descending nearly to the flange of the bed. Thus placed, the bed being attached to the shaft will revolve with it, and the knife secured in its place revolves with the bed, and passing between the scraper and division plates of the hopper is thereby in every revolution freed from all adhesive matter tending to clog or obstruct its operation. To prevent the cuttings in the chamber from interfering with the point of the shaft and step, I guard them with a thin collar of conical shape, resting on the bottom of the chamber and loosely embracing the collar of the bed on the shafts, as seen Fig. 1, K. Thus put together the machine is easily taken apart for repairs or for cleaning as may be required. The machine thus arranged, as seen in the combined view Fig. 1, is put into rapid motion, by a crank or other suitable gearing on the end of the shaft, and may be moved by hand, or by water or other power, thereby turning the shaft with the bed including the knife, while the hopper and its appendages remain at rest, by means of which meat, divested of bones, or any other suitable substance placed in the hopper is speedily cut up according to the given gage, and the cuttings fall in slices or shreds through the orifice in the bed into the receiving chamber, and if required may be cross cut by a second operation, and the substance thus operated upon is thus uniformly reduced to any degree of fineness required.

The dimensions of this machine may be enlarged or lessened according to the use intended, or to the power to be applied.

The use on an extended scale is particularly calculated to be connected with a new and improved mode of putting up and preserving meats of different kinds for future use, and also for other important purposes.

For further illustration I refer to the accompanying drawings.

What I claim as my invention and improvement is—

1. The scraper as specified.
2. The alteration in the form and construction of the machine, as improved whereby the cutting is performed by a single horizontal knife aided by the scraper as specified—by means of which a multiplicity of knives is dispensed with—all clogging of the parts is avoided, and the machine is rendered more simple—is easier worked, and easier cleaned, and the work as well and more expeditiously performed, and therefor I solicit Letters Patent.

April 25th, 1837.

JOHN MORRIS.

Witnesses:
SIMEON BALDWIN,
E. BALDWIN.